United States Patent [19]

Cloeren

[11] Patent Number: 4,780,258
[45] Date of Patent: Oct. 25, 1988

[54] COEXTRUDED LAMINATE HAVING BARRIER LAYERS

[75] Inventor: Peter F. Cloeren, Orange, Tex.

[73] Assignee: P.C.E. Corp., Orange, Tex.

[21] Appl. No.: 74,951

[22] Filed: Jul. 17, 1987

[51] Int. Cl.[4] .................. B29C 47/06; B29C 47/14
[52] U.S. Cl. .................... 264/171; 264/514; 264/DIG. 69; 425/131.1; 425/133.5; 425/192 R; 425/462; 428/35
[58] Field of Search ............... 264/171, 514–515, 264/37, DIG. 69; 425/131.1, 133.5, 462, 192 R; 428/35

[56] References Cited

U.S. PATENT DOCUMENTS

| | | | |
|---|---|---|---|
| 3,397,428 | 8/1968 | Donald | 425/133.5 |
| 3,479,425 | 11/1969 | Lefevre et al. | 264/171 |
| 3,860,372 | 1/1975 | Newman, Jr. | 425/133.1 |
| 3,932,692 | 1/1976 | Hirata et al. | 428/474 |
| 4,197,069 | 4/1980 | Cloeren | 425/131.1 |
| 4,402,889 | 9/1983 | Bonis | 425/131.1 |
| 4,410,602 | 10/1983 | Komoda et al. | 428/516 |
| 4,436,778 | 3/1984 | Dugal | 264/515 |
| 4,533,510 | 8/1985 | Nissel | 425/131.1 |
| 4,551,365 | 11/1985 | Bonis | 264/515 |
| 4,572,854 | 2/1986 | Dallmann et al. | 156/244.11 |
| 4,619,802 | 10/1986 | Cloeren | 264/171 |
| 4,629,596 | 12/1986 | Coffman | 264/171 |
| 4,652,325 | 3/1987 | Benge et al. | 156/244.11 |
| 4,657,497 | 4/1987 | Dehennau et al. | 425/381 |
| 4,729,926 | 3/1988 | Koteles et al. | 264/176.1 |

FOREIGN PATENT DOCUMENTS 55-28825 2/1980 Japan.

OTHER PUBLICATIONS

Sketch of 9 Layer Dual Plane Feedblock Including Removably Mounted Die.
Sketch of 9 Layer Single Plane Feedblock Including Removably Mounted Die.
Sketch of 7 Layer Single Plane Feedblock Including Removably Mounted Die.

*Primary Examiner*—Jeffery Thurlow
*Attorney, Agent, or Firm*—Timothy R. Kroboth

[57] ABSTRACT

The present invention provides a novel process for the coextrusion of a laminate containing more than a single barrier layer. Also provided is a coextruded composite useful for forming containers. Additionally, there is provided a unique coextrusion apparatus useful for forming the laminate.

12 Claims, 2 Drawing Sheets

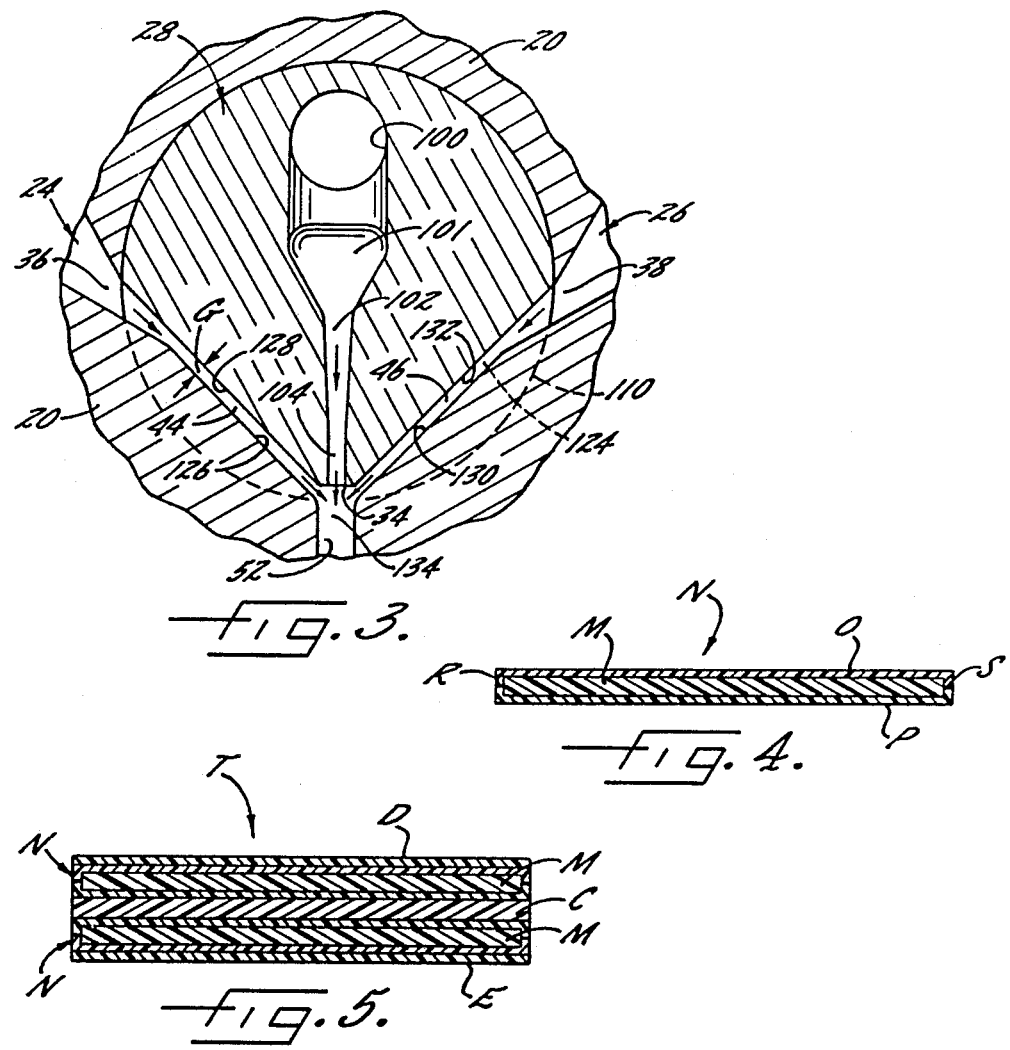

COEXTRUDED LAMINATE HAVING BARRIER LAYERS

TECHNICAL FIELD

This invention relates to coextrusion, particularly of a laminate having multiple barrier layers which provide a barrier especially to oxygen and moisture, and for retaining aroma.

BACKGROUND ART

In the packaging industry, a layered sheet or film having a single barrier layer of, for example, ethylene vinyl alcohol polymer (hereinafter called "ethylene vinyl alcohol") or polyvinylidene chloride polymer (hereinafter called "Polyvinylidene chloride"), is widely used. A barrier layer serves to prolong the freshness and shelf-life of food by, for instance, acting as a barrier to oxygen and moisture, and retaining aroma. However, any imperfections in a barrier layer, will interrupt the integrity of the barrier. Therefore, there is a need for an improved packaging material, in particular an improved food packaging material.

In forming containers from coextruded sheet, considerable scrap is produced. For economic reasons, it is desirable to recycle the scrap. However, organoleptic contamination should be prevented, particularly for a food packaging material made from coextruded sheet. Therefore, there is a need for a food packaging material made from coextruded sheet, that includes a high percentage of scrap, say about 30-65% of the total volume, and yet protects a food product and consumer from organoleptic contamination by the recycled scrap.

Typically, the barrier layer of a laminated sheet is located at or near the center of the sheet. Accordingly, when the barrier layer is ethylene vinyl alcohol, which typically will have a higher softening point and a more rapid rate of crystallization than other polymers used in the laminate, the draw ratio is limited, and it is difficult to solid phase pressure form the laminated sheet without exceeding the desired forming temperatures of the other polymers. Therefore, a laminated sheet including an ethylene vinyl alcohol barrier layer and having an improved draw ratio and forming range, is needed.

As illustrated by U.S. Pat. No. 4,197,069 to Cloeren, a coextrusion apparatus having an adjustable vane blade between flow channels, is known. The adjustable blade provides for stream convergence at substantially equal flow velocities.

As exemplified by U.S. Pat. Nos. 3,397,428 to Donald, 3,479,425 to Lefevre et al, and 3,860,372 to Newman, Jr., encapsulation of a core stream is known. Japanese Patent Document No. 55/28825 illustrates a multimanifold die that, as shown in FIG. 7 thereof, is able to produce a core layer sandwiched within adjacent layers.

Also known is a coextrusion apparatus that includes a removable die mounted within a feedblock. The die includes a streamlined flow passage highly suited for barrier materials for which residence time should be limited.

Transverse flow occurs in the die, which is rigidly mounted between a first flow channel and a second flow channel. The die has an exit slot of less width than the width of these flow channels. As a result, a stream of a barrier material exiting from the die, is sandwiched within streams from these flow channels.

Pivotably mounted between the first flow channel and a third flow channel is an adjustable vane blade. Likewise, between the second flow channel and a fourth flow channel is another pivotably mounted, adjustable vane blade.

Each flow channel includes a tapered flow-restriction channel. As in U.S. Pat. No. 4,197,069, by adjustment of flow-restriction channel width through radial movement of a vane blade point end, the convergence of streams at substantially equal flow velocities is effected.

Adjacent to the point end of a vane blade is a removably mounted, adjustable distribution pin. The pin is externally accessible for adjustment. Cooperation of a distribution pin with the adjacent vane blade tip, provides, if needed, for profiling.

Profiling results in each layer of a laminate product having a substantially uniform widthwise cross-section. In the profiling process, the cross-sectional configuration of a stream, viewed perpendicular to the flow-direction, is transformed from a rectangular shape to a shape that is changed back to the original rectangular shape as a melt-laminate formed from converging streams, passes through a downstream die manifold.

Despite the improvements provided by these apparatus, none is suited for the coextrusion of a laminate containing more than one barrier layer. Therefore, there is a need for a process for coextruding a laminate containing more than one barrier layer.

An additional drawback of the removable die-containing coextrusion apparatus, is that the presence of streams on both sides of an adjustable vane blade, affords a complex flow control situation. Furthermore, situations will arise where the streams on each side of a vane blade have opposing needs. It is desirable that a coextrusion apparatus provide simplified and improved flow control.

DISCLOSURE OF THE INVENTION

It is accordingly an object of the present invention to provide a process for coextruding a laminate containing more than one barrier layer.

It is a further object of the present invention to provide a coextrusion process that has simplified and improved flow control.

It is a still further object to provide an improved packaging material that includes a barrier of higher integrity than is provided by a single barrier layer.

It is an even further object to provide an improved food packaging material made from coextruded sheet, that includes a high percentage of recycled scrap, and yet protects a food product and consumer from organoleptic contamination by the scrap.

It is an additional object to provide a laminated sheet including an ethylene vinyl alcohol barrier layer and having an improved draw ratio and forming range.

It is another object to provide an extrusion apparatus useful for making a laminate having more than one barrier layer.

Additional objects, advahtages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided a novel coextrusion process. In the process, a first stream of a barrier material and a second stream of a barrier material are passed through separate streamlined flow passages in which transverse flow occurs. The streams may be of the same or a different barrier material.

Thereafter, each transversely spread stream of barrier material is sandwiched within a pair of transversely spread, side streams. The result, in each instance, is a melt-laminate sandwich in which the barrier material is the core.

Each melt-laminate is then passed through a variable gap flow channel of a critical length. The channel length must be long enough to provide a transition of flow velocity that prevents disturbance in laminar flow at convergence, and yet short enough to provide for minimal residence time.

Afterwards, the melt-laminate sandwiches and a third stream are converged. The resulting composite stream includes two barrier layers.

Also provided by the invention is a coextruded composite for forming containers, in particular rigid containers such as are used for packaging food. The composite includes at least nine layers. In the composite, a core layer is disposed between a pair of barrier layers. Preferably, the core layer is recycled scrap.

In addition, the present invention provides a unique coextrusion apparatus. A main body of the apparatus includes several flow channels and flow passages.

The coextrusion apparatus includes a die mounted between a first flow channel and a second flow channel. A wall of the main body of the apparatus cooperates with an opposite face of the die to form a land channel of the first flow channel. A second wall of the main body cooperates with the other die face to form a land channel of the second flow channel. In fluid communication with the first flow channel, an exit channel of the die, and the second flow channel is a first flow passage.

In addition, the coextrusion apparatus includes a second die disposed between a third flow channel and a fourth flow channel. A third wall of the main body of the apparatus cooperates with an opposite face of the second die to form a land channel of the third flow channel. A fourth wall of the main body cooperates with the other face of the second die to form a land channel of the fourth flow channel. In fluid communication with the third flow channel, an exit channel of the second die, and the fourth flow channel, is a second flow passage.

Mounted between the first flow passage and a fifth flow channel is a first vane blade, and between the second flow passage and the fifth flow channel is a second vane blade. A face of the first vane blade and an opposite wall of the main body of the apparatus, define a variable gap portion of the first flow passage. A face of the second vane blade and an opposite wall of the main body of the apparatus define a variable gap portion of the second flow passage.

Each variable gap portion has a critical length. The length is long enough to provide a transition of flow velocity that prevents disturbance in laminar flow at a locus of convergence of the first flow passage, the second flow passage and the fifth flow channel. On the other hand, the length is short enough to provide for minimal residence time in the flow passage.

In fluid communication with the first flow passage, the fifth flow channel, and the second flow passage is a third flow passage.

In the drawing and in the detailed description of the invention that follows, there is shown and essentially described only a preferred embodiment of this invention, simply by way of illustration of the best mode contemplated by me of carrying out the invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

FIG. 3 is a cross-sectional view taken along line 3—3 of FIG. 2, showing details of land channels 44,46 and flow convergence of a stream exiting from barrier die 28 with streams from the land channels;

FIG. 4 is a cross-sectional view of a melt-laminate sandwich N, taken substantially along line 4—4 of FIG. 1; and FIG. 5 is a cross-sectional view of a composite stream T, taken substantially along line 5—5 of FIG. 1.

BEST MODE FOR CARRYING OUT THE INVENTION

As explained above, the present invention is directed to a novel process for coextruding a laminate containing a second barrier layer, to a coextruded composite useful for forming containers, and to a unique coextrusion apparatus. It is intended that this invention be primarily used for making a coextruded laminate useful as a packaging material such as for packaging food.

As a result, the invention is intended for use with synthetic resins or liquid crystalline polymers useful as barrier materials. Exemplary barrier materials may be thermally unstable or heat-sensitive such as ethylene vinyl alcohol and polyvinylidene chloride. The residence time of these resins in a coextrusion apparatus should be limited; otherwise, degradation is accelerated.

Figure 1:
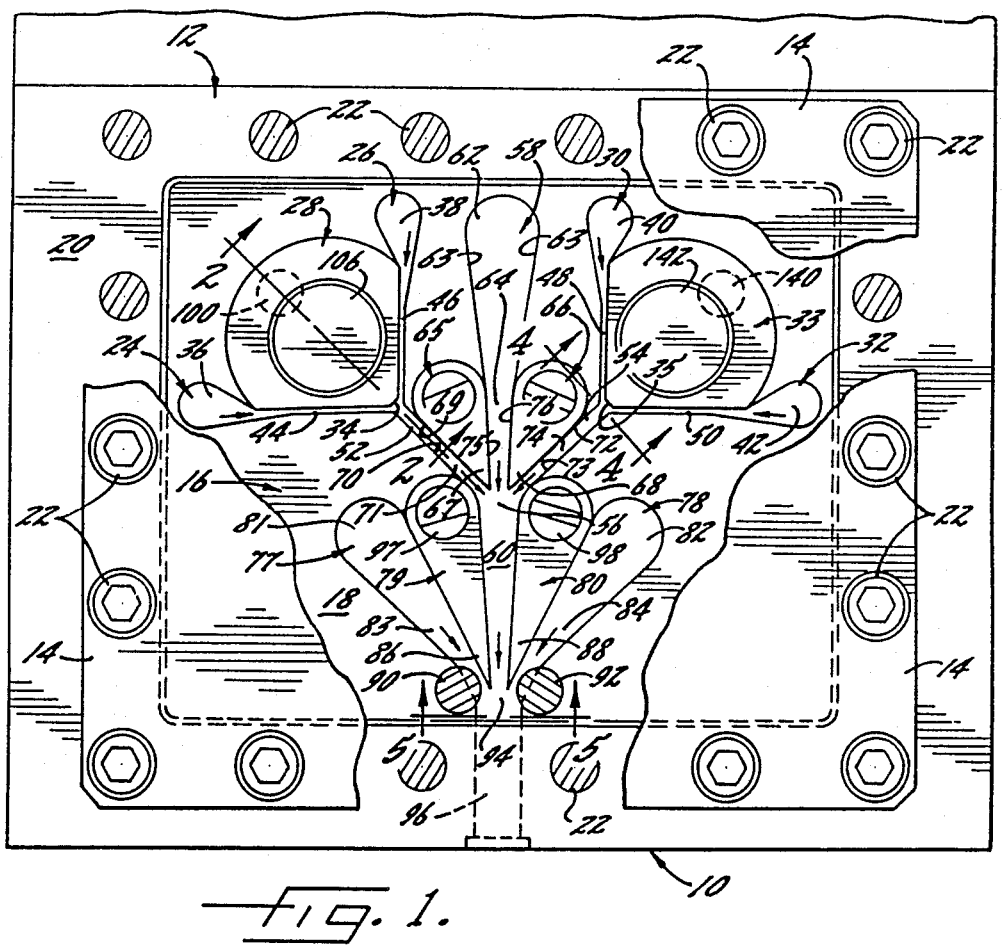
FIG. 1 is a plan view with portions of a housing plug 14 removed, of a preferred coextrusion apparatus 10 useful in the present invention.

Referring to FIG. 1, a preferred embodiment of a novel coextrusion apparatus 10 useful in the unique process of the present invention, is shown. As will become clear from the following description, the apparatus is designed to provide streamlined flow and minimal residence time.

The apparatus is depicted in a feedblock 12, with portions of a housing plug 14 broken away to expose the apparatus to view. Also revealed is a recess 16 having a bottom wall 18, in a main body 20 of the feedblock. The housing plug is bolted to the main body of the feedblock by bolts 22.

In the main body of feedblock 12 are flow channels 24,26, between which a die 28 is mounted, and are flow channels 30,32, between which a second die 33 is mounted. Feed channels for flow channels 24,26,30,32 are not shown.

Transverse flow occurs in dies 28,33, which are advantageously easily removable from the feedblock. The dies include exit slots 34,35, respectively, through which a stream flows from its respective die.

Each flow channel includes a manifold 36,38,40,42 and a land channel 44,46,48,50, as shown. Transverse flow of a stream occurs in a flow channel manifold. The diminished cross-section of a land channel vis-a-vis its manifold, restricts flow, thus providing for the transverse flow.

Downstream, side flow channels 52,54 converge at a locus of convergence 56, with a center flow channel 58 to form a center flow passage 60. The angle of convergence between either side channel and center channel 58 is suitably about 45°. A feed channel for center flow channel 58 is not shown.

Center flow channel 58 includes a manifold 62, in which transverse flow occurs, and a flow-restriction channel 64. Manifold 62 is advantageously entirely defined by a feedblock wall 63.

Center flow channel 58 provides a pressure drop ratio sufficient for transverse flow to be completed within manifold 62. The pressure drop ratio is determined by several factors including the length and gap of flow-restriction channel 64 and the viscosity and viscoelastic memory of the flow stream. A pressure drop ratio of about 10:1 is generally sufficient.

Situated between side flow chnnel 52 and center flow channel 58, and between center flow channel 58 and side flow channel 54 are pivotably mounted, vane blades 65,66, as shown. Advantageously, the vane blades are externally adjustable for variably restricting flow for the control of flow velocity, particularly so as to provide an equalized flow velocity of the flow streams at locus of convergence 56. Locus of convergence 56 is proximate to tips 67,68 of the vane blades.

A face 69 of vane blade 65 and a feedblock wall 70 define a variable gap portion 71 of side flow channel 52, and a face 72 of vane blade 66 and a feedblock wall 73 define a variable gap portion 74 of side flow channel 54. Each variable gap portion has a critical length. The length is sufficiently long to provide a transition of flow velocity that prevents disturbance in laminar flow at locus of convergence 56, but sufficiently short to provide for minimal residence time in the side flow channels.

A second face 75 of vane blade 65 and a second face 76 of vane blade 66 define flow-restriction channel 64 of flow channel 58. Relative to the combined gaps of side flow channels 52,54, it is preferred that the gap of flow-restriction channel 64 be such that a stream from center flow channel 58 provides about 40-85% of the thickness of a composite stream formed at locus of convergence 56, and about 30-65% of the thickness of the coextruded laminate of FIG. 5.

Pivotably mounted between a downstream flow channel 77 and center flow passage 60, and between center flow passage 60 and a downstream flow channel 78 are vane blades 79,80. Like the upstream vane blades, these vane blades are advantageously adjustable.

Downstream flow channels 77,78 include manifolds 81,82 and tapered flow-restriction channels 83,84, as shown, which are defined in part by a vane blade face. Transverse flow takes place in manifolds 81,82. Feed channels for the downstream flow channels are not shown.

Adjustable vane blades 79,80 are employed to variably restrict flow. As can be seen from FIG. 1, upstream vane blades 65,66 are shorter than these vane blades. The upstream vane blades can be made shorter especially since manifold 62 of center flow channel 58 is entirely defined by feedblock wall 63, and since no transverse flow takes place in side channels 52,54 or in flow-restriction channel 64 of center flow channel 58. Accordingly, the length of the faces of the upstream vane blades is determined principally by a critical balance between a sufficient length to prevent disturbance in laminar flow at locus of convergence 56, and the desire for minimal residence time in the side flow channels. It can be observed from FIG. 1 that the length of the variable gap portion of a side flow channel is determined by the length of the face of a vane blade.

Near tips 86,88 of vane blades 79,80 are removably mounted distribution pins 90,92, which serve downstream flow channels 77,78, respectively, as necessary. Downstream flow channels 77,78 and center flow passage 60 converge at a point of confluence 94, to form an exit flow passage 96.

If desired or appropriate, distribution pins could be employed for cooperation with tips 67,68 of vane blades 65,66. In such case, an additional pair of distribution pins would be located in the proximity of round shafts 97,98 of vane blades 79,80, and center flow passage 60 would be lengthened to permit vane blades 79,80 to be located further downstream from vane blades 65,66.

Figure 2:
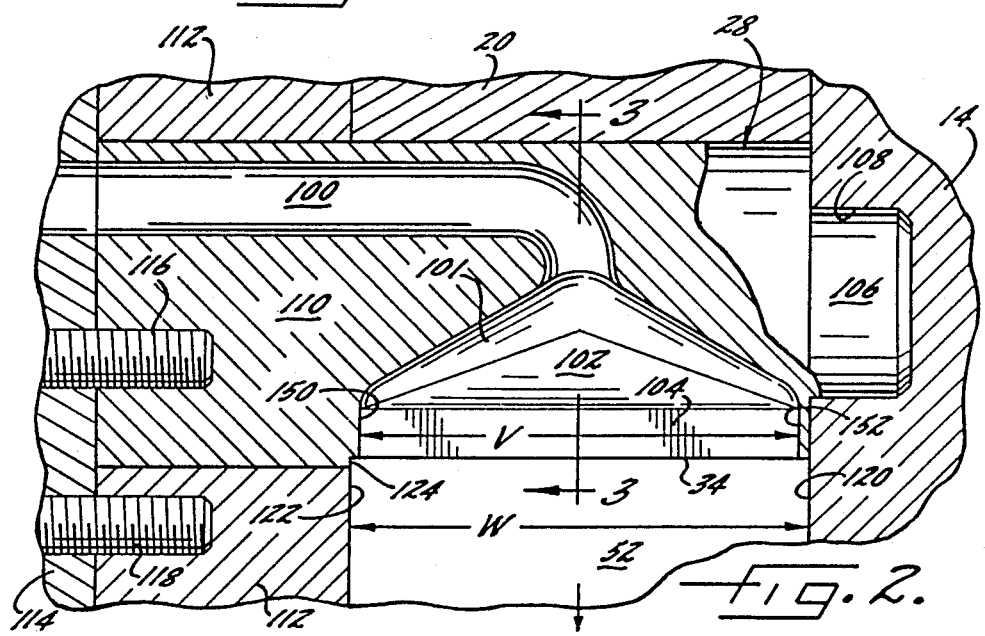
FIG. 2 is a partial cross-sectional view of the coextrusion apparatus of FIG. 1, particularly of barrier die 28, taken along line 2—2 of FIG. 1.

Referring now to FIG. 2, removable die 28 has a streamlined passage that advantageously provides for streamlined flow and reduced residence time in the die. The passage includes a die inlet channel 100, a manifold 101, preferably of the coat-hanger type, a preland channel 102, and a die exit or land channel 104, which, as shown in FIG. 3, suitably has parallel walls.

Transverse flow takes place in die manifold 101. The length and gap of die land channel 104 ensure uniform transverse distribution of a stream as it enters the die land channel.

Unlike the vane blades which are adjustable, die 28 is preferably fixed in place as now described. A round shaft 106 at an end of die 28 is supported by a bearing surface 108, which is located in housing plug 14, and an opposite die end 110 is bolted to a housing plug 112 through a flange 114 by bolts 116,118 (only one of each shown).

As pointed out earlier, die 28 is advantageously removable from the feedblock. By removal of bolts 118 and by grasping flange 114, the die can be withdrawn from the feedblock.

Inner walls 120,122 of housing plugs 14,112, respectively, define a width W for side flow channel 52. This width is conveniently the same for the other flow channels and flow passages, for example, flow channels 24,26,54,58,78 and flow passages 60,96. Typically, in the case of a feedblock, this width is 4".

Referring now also to FIG. 3, the width of flow channels 24,26 is defined by a wall 124 at die end 110, in addition to inner walls 120,122 of the housing plugs.

With continued reference to FIG. 3, a feedblock wall 126 and an opposing die face 128 define a gap G of land channel 44. The land channel should have a gap and a length sufficient to restrict flow such than an adequate back pressure is produced in manifold 36 to provide uniform transverse distribution of a stream entering the land channel.

Land channel 44 should have a gap that matches the flow velocity of a stream exiting therefrom, to that of a stream exiting die 28, thereby promoting laminar flow at convergence. Assuming a constant volume output from the land channel, a relatively larger gap permits a relatively decreased velocity of the exiting stream, whereas a relatively smaller gap produces a relatively increased velocity of the exiting stream.

The length of the land channel should also ensure that a uniform cross-sectional and longitudinal velocity profile of the exiting stream is established prior to convergence with the stream exiting die 28.

The land channel walls are suitably parallel. However, the walls could be tapered in the direction of flow.

A feedblock wall 130 and an opposite die face 132 define the gap of land channel 46. The gap and length of this land channel are controlled by considerations similar to those set forth for land channel 44. Land channel 46 is typically identical to land channel 44.

Furthermore, similar considerations govern the gap and length of die land channel 104 of removable die 28. However, an important distinction is that the output from die 28 is typically set first, and land channel dimensions are chosen based upon the die output.

At a place of convergence 134, land channels 44,46 converge with exit channel 104 of die 28 to form side channel 52. The angle of convergence between either land channel and side channel 52 is suitably about 45°.

The rigid mounting of die 28 and the cooperation of feedblock walls 126,130 with die faces 128,132 to form land channels 44,46, provides a fixed geometry to the land channels. Accordingly, a constant proportionality between the land channel output and the die output can be maintained for flow channels 24,26 and die exit channel 104.

Referring again to FIG. 1, die 33 is suitably identical in all respects to die 28. Thus, die 33 has a streamlined internal passage that includes a die inlet channel 140, a coat-hanger type manifold (not shown), and an exit channel (not shown); and the die is preferably fixed in place with a round shaft 142 at an end of the die, being supported by a bearing surface (not shown) of housing plug 14.

Likewise, land channels 48,50 each have a gap and length that are determined by considerations similar to those set forth for land channels 44,46; and the gap and length of the die exit channel of die 33 are governed by considerations similar to those determinative for exit channel 104 of die 28.

As in the case of land channels 44,46, the gap and length of land channel 48 is typically identical to the gap and length of land channel 50. Furthermore, land channels 48,50 are suitably identical to land channls 44,46, in regard to gap and length.

Suitably, exit slot 34 of die 28 is of rectangular cross-section. When a polymer having a high resistance to flow relative to polymers flowing through channels 24,26, is passed through die 28, it may be advantageous to provide a heavy edge flow of the high resistance polymer from die 28 so as to achieve uniform lateral distribution through a downstream die manifold. A heavy edge flow may be achieved with an exit slot having a relatively larger gap at its ends than between its ends. Polyvinylidene chloride exemplifies a high resistance polymer.

Referring again to FIG. 2, exit slot 34 has a width V defined by surfaces 150,152 of exit channel 104. As can be seen, this width is less than width W, the width of flow channels 24,26.

With reference again to FIG. 1, exit slot 35 of die 33 typically has a width identical to that of width V of exit slot 34. This width of exit slot 35 is less than the width of flow channels 30,32, which is conveniently W. As a consequence, streams passing through flow channels 30,32 form a melt-laminate N, shown in FIG. 4, in which a core stream exiting from slot 35, is sandwiched between the transversely spread streams passing from channels 30,32.

Illustratively, when width W is 4", width V may be 3 15/16". A lesser width V may be chosen if wider edges of the sandwich are desired. An advantage of removability of dies 28,33 is that each die may be replaced with an interchangeable die having a different width and/or gap for the exit slot.

Referring again to FIG. 3, if desired, a pair of distribution pins could be employed proximate to the place of convergence of the streams exiting land channel 104 of die 28 and land channels 44,46 of flow channels 24,26, that is, proximate to place of convergence 134. As a result, it would be possible to influence the profile of converging streams.

This optional feature is shown in FIG. 8 of, and described with particularity in, U.S. application Ser. No. 059,102, entitled "Improved Coextrusion Apparatus and Process" and filed in the name of Peter F. Cloeren on June 5, 1987, which figure and the relevant portions of which disclosure are hereby incorporated by reference into this application. It will be, of course, understood that this modification would require that side channel 52 be lengthened to provide space for the distribution pins.

Likewise, with reference to FIG. 1, a pair of distribution pins could be employed proximate to the place of convergence of the streams exiting die 33 and flow channels 30,32.

Additionally, if desired, each die could include a pair of edge seam-forming channels at each end of its exit slot. This optional feature is described with particularity also in U.S. application Ser. No. 059,102, the relevant portions of the disclosure of which are hereby incorporated by reference into this application.

Operation of coextrusion apparatus 10 will now be described for making a laminate having two polyvinylidene chloride barrier layers. Other barrier materials could, of course, be chosen, and it will be understood that, if desired, the barrier layers could be of different barrier materials.

For sandwiching a polyvinylidene chloride barrier layer, ethylene vinyl acetate, an exemplary thermoplastic adhesive, is useful. Other suitable adhesives or a suitable non-adhesive could be used, with the selection of this material usually depending upon the barrier material chosen.

Barrier dies 28,33, each having a 3 15/16"×0.057" exit slot, are selected for use and inserted into feedblock 12, which has a width W of 4" for the flow channels and passages. The land channel of each barrier die is 0.25" in length. The barrier dies are advantageously made of nickel.

Barrier die 28 is selected to provide a gap G of 0.055" for each of land channels 44,46. This gap matches the output velocity of the adhesive streams from land channels 44,46 to the output velocity of the polyvinylidene chloride stream from barrier die 28. Factors influencing the gap selection include the polymer rheology, flow viscosity and the shear stress at the land channel walls. The length of land channels 44,46 is 1".

Barrier die 33 is selected to conveniently provide an identical gap and length for each of land channels 48,50.

Side flow channel 52 has a gap of 3/16" when the channel walls are parallel to one another, and the variable gap portion of the channel has a length of 1". Conveniently, side flow channel 54 has the same dimensions.

Center flow channel 58 provides a pressure drop ratio of 10:1. The length of flow-restriction channel 64 of channel 58 is 1". When faces 75,76 of vane blades 65,66 are parallel to one another, flow-restriction channel 64 has a gap of ½".

In operation, molten streams of an ethylene vinyl acetate adhesive enter flow channels 24,26, undergo transverse flow in manifolds 36,38, and enter land channels 44,46. Simultaneously, a molten stream of polyvinylidene chloride enters the streamlined passage of barrier die 28 through a feed tube (not shown), also made of nickel, undergoes transverse flow in die manifold 101, passes through die exit channel 104, and exits the die through slot 34. At place of convergence 134 in side channel 52, the adhesive streams exiting from land channls 44,46 and the polyvinylidene chloride stream converge.

Similarly, molten streams of an ethylene vinyl acetate adhesive enter flow channels 30,32, undergo transverse flow in manifolds 40,42, and enter land channels 48,50. At the same time, a molten stream of polyvinylidene chloride enters the streamlined passage of barrier die 33 through a feed tube (not shown), also made of nickel, undergoes transverse flow in the die manifold, passes through the die exit channel, and exits the die through slot 35. The adhesive streams exiting from land channels 48,50 and the polyvinylidene chloride stream converge in side channel 54.

In each instance, a polyvinylidene chloride core stream is isolated within thin, contiguous layers of an adhesive. As shown in FIG. 4, melt-laminate N has a barrier layer M of polyvinylidene chloride sandwiched between adjacent layers O,P of adhesive. Seam lines R,S reveal the convergence of layers O,P to form the edges of the sandwich.

Similarly, a stream of a reclaim material enters flow channel 58, undergoes transverse flow in manifold 62, and passes through flow-restriction channel 64. Vane blades 65,66 are adjusted as needed to control flow velocity.

At locus of convergence 56 in main flow passage 60, the melt-laminate sandwiches exiting from side channels 52,54, converge with the stream of reclaim material to form a composite stream having two barrier layers between which a center layer of a reclaim material is disposed.

Upon exiting from main flow passage 60, the composite stream converges at place of convergence 94, with molten streams from downstream flow channels 77,78. These molten streams form a melt-laminate T having nine layers.

FIG. 5 depicts melt-laminate T, which has two barrier layers M,M separated by a reclaim layer C, and which has skin layers D,E. Approximately 60 volume % of laminate T is reclaim layer C.

Illustrative thermoplastics for use as skin layers are olefinic and styrenic polymers. However, it will be understood that any other suitable material could be chosen, with the selection of the material generally being determined by the desired properties of the coextruded laminate.

After melt-laminate T has been passed through a downstream die manifold, a coextruded laminate is obtained that includes a barrier layer superimposed over another barrier layer. As there is a low probability of overlapping imperfections in the barrier layers, the laminate has a barrier of higher integrity than that of a single barrier layer. Furthermore, the combined thickness of the barrier layers is less than the thickness required for a single barrier layer to provide a comparable barrier.

Although a container made from the laminate includes approximately 60% recycled scrap, a food product and consumer are protected from organoleptic contamination by the scrap being located between the barrier layers.

When the foregoing process is carried out using ethylene vinyl alcohol as the barrier material, the ethylene vinyl alcohol layers are located exterior to the thick scrap core of the laminate. As a consequence, the laminate has an increased draw ratio and expanded forming range, compared to a laminate in which an ethylene vinyl alcohol barrier layer is located at or near the center of the laminate.

In the preceding description of the present invention, there is shown and essentially described only a preferred embodiment of this invention, but as mentioned above, it is to be understood that the invention is capable of changes or modifications within the scope of the inventive concept expressed herein. Several changes or modifications have been briefly mentioned for purposes of illustration.

Industrial Applicability

This invention is useful for the coextrusion of a laminate containing more than a single barrier layer. Acoordingly, the invention is able to provide coextruded composites useful as a packaging material, especially in the food industry.

I claim:
1. A coextrusion process comprising
  (a) transversely spreading a first stream of a barrier material and a second stream of a barrier material that may be the same or different, each to a certain width, and passing each transversely spread stream of barrier material through a die exit slot,
  (b) thereafter totally surrounding each transversely spread stream of barrier material within a pair of streams transversely spread to a width greater than said certain width, to form a melt-laminate sandwich in which the barrier material is the core,
  (c) passing each melt-laminate sandwich through a flow passage comprising a variable gap flow channel sufficiently long to provide a transition of flow velocity that prevents disturbance in laminar flow at convergence, and yet sufficiently short to provide minimal residence time in said flow passage, and (d) converging the melt-laminate sandwiches and a third stream to form a composite stream comprising barrier layers.

2. The coextrusion process of claim 1, wherein said third stream is disposed between the melt-laminate sandwiches of said composite stream.

3. The coextrusion process of claim 2, further comprising converging said composite stream with a pair of side streams to form a melt-laminate having at least nine layers.

4. The coextrusion process of claim 3, wherein said third stream has a thickness equal to about 30 to 65% of the thickness of said melt-laminate having at least nine layers.

5. A coextrusion apparatus comprising
(a) a main body comprising a plurality of flow channels and flow passages;
(b) a first die body disposed between a first flow channel and a second flow channel; wherein said main body has a first wall which cooperates with a first face of said first die body to form a portion of said first flow channel, and has a second wall which cooperates with a second face of said first die body to form a portion of said second flow channel; said first die body comprising a transverse flow-providing chamber and a flow-restricting channel in fluid communication therewith, said flow-restricting channel terminating in an exit slot of less width than a first flow channel width and of less width than a second flow channel width;
(c) a first combined flow passage in fluid communication with said first flow channel, said flow-restricting channel of said first die body, and said second flow channel, said first combined flow passage being of constant width;
(d) a second die body comprising a transverse flow-providing chamber, said second die body being disposed between a third flow channel and a fourth flow channel; wherein said main body has a third wall which cooperates with a first face of said second die body to form a portion of said third flow channel, and has a fourth wall which cooperates with a second face of said second die body to form a portion of said fourth flow channel; said second die body further comprising an exit slot of less width than a third flow channel width and of less width than a fourth flow channel width;
(e) a second combined flow passage in fluid communication with said third flow channel, said second die body and said fourth flow channel, said second combined flow passage being of constant width;
(f) a first adjustable divider means disposed between a fifth flow channel and said first combined flow passage, and a second adjustable divider means disposed between said fifth flow channel and said second combined flow passage;
wherein a first face of said first adjustable divider means and a fifth wall of said main body define a variable gap portion of said first combined flow passage, wherein a first face of said second adjustable divider means and sixth wall of said main body define a variable gap portion of said second combined flow passage, and wherein each variable gap portion is sufficiently long to provide a transition of flow velocity that prevents disturbance in laminar flow at a locus of convergence of said first combined flow passage, said second combined flow passage and said fifth flow channel, and yet sufficiently short to provide minimal residence time in the respective combined flow passage; and
(g) a third combined flow passage in fluid communication with said first combined flow passage, said fifth flow channel, and said second combined flow passage.

6. The coextrusion apparatus of claim 5, wherein a second face of said first adjustable divider means and a second face of said second adjustable divider means define a flow-restriction channel of said fifth flow channel.

7. The coextrusion apparatus of claim 5, wherein a flow-restriction channel of said fifth flow channel has a gap relative to the combined gaps of said first combined flow passage and second combined flow passage such that about 40–85% of the thickness of a composite stream formed by convergence of streams from said fifth flow channel, said first combined flow passage, and second combined flow passage, is provided by the stream from said fifth flow channel.

8. The coextrusion apparatus of claim 5, wherein said die bodies are removably mounted.

9. The coextrusion apparatus of claim 5, wherein said die bodies are made of nickel.

10. The coextrusion apparatus of claim 5, wherein each of said first, second, third, and fourth flow channels comprises a transverse flow-providing chamber and a flow-restricting channel in fluid communication therewith.

11. The coextrusion apparatus of claim 5, wherein said first adjustable divider means and second adjustable divider means are each pivotably mounted.

12. The coextrusion process of claim 1, wherein each melt-laminate sandwich includes seamed edges formed by the confluence of said pair of streams.

* * * * *